United States Patent
Pasquier et al.

(10) Patent No.: US 10,638,102 B2
(45) Date of Patent: Apr. 28, 2020

(54) METHOD AND APPARATUS FOR COMPENSATING THE COLORIMETRY OF A PROJECTED IMAGE

(71) Applicant: NINTENDO EUROPEAN RESEARCH AND DEVELOPMENT, Paris (FR)

(72) Inventors: François-Xavier Pasquier, Suresnes (FR); David Cade, Paris (FR); Janos Boudet, Paris (FR); Sébastien Guido, Saint-Ouen (FR)

(73) Assignee: NINTENDO EUROPEAN RESEARCH AND DEVELOPMENT, Paris (FR)

( * ) Notice: Subject to any disclaimer, the term of this patent is extended or adjusted under 35 U.S.C. 154(b) by 42 days.

(21) Appl. No.: 16/127,424

(22) Filed: Sep. 11, 2018

(65) Prior Publication Data
US 2019/0246082 A1 Aug. 8, 2019

(30) Foreign Application Priority Data
Feb. 7, 2018 (EP) .................................... 18305129

(51) Int. Cl.
*H04N 9/31* (2006.01)

(52) U.S. Cl.
CPC ......... *H04N 9/3182* (2013.01); *H04N 9/3194* (2013.01)

(58) Field of Classification Search
CPC .................................................... H04N 9/3194
See application file for complete search history.

(56) References Cited

U.S. PATENT DOCUMENTS

| 2012/0320042 | A1 | 12/2012 | Green et al. |
| 2018/0033401 | A1* | 2/2018 | Nakagoshi ............. G09G 5/006 |
| 2018/0131913 | A1* | 5/2018 | Nakagoshi ............. H04N 9/317 |

OTHER PUBLICATIONS

Search Report for EP18305129.1 dated Aug. 1, 2018, 11 pages.

* cited by examiner

*Primary Examiner* — Edward Park
(74) *Attorney, Agent, or Firm* — Nixon & Vanderhye PC

(57) ABSTRACT

Real time compensation of the colorimetry of an image projected on a non-uniform projection surface is disclosed. The projected image is captured and coefficients of a simplified model of the projection surface are estimated by minimizing the distance between the captured image and a target image obtained from the original image.

17 Claims, 5 Drawing Sheets

METHOD AND APPARATUS FOR COMPENSATING THE COLORIMETRY OF A PROJECTED IMAGE

CROSS-REFERENCE TO RELATED APPLICATIONS

This application claims the benefit under 35 U.S.C. § 119(a)-(d) of European Patent Application No. EP18305129.1, filed on 7 Feb. 2018 and entitled "method and apparatus for compensating the colorimetry of a projected image". The above cited patent application is incorporated herein by reference in its entirety.

BACKGROUND OF THE INVENTION

The present disclosure concerns a method and a device for compensating the colorimetry of a projected image on a non-uniform projection surface.

An image is constituted by an array of elementary points called pixels. Each pixel in the image is typically represented by a triplet of numeric values (r, g, b) giving the intensity of the colour for the given pixel in a colour space, generally the colour space (R, G, B) of three base colours, namely red, green, blue. Other colour spaces may be used, for example, the colour space (Y,U,V) where the Y component represents the luminosity of the pixel, and (U, V) the chromatic components for coding the colour.

When such an image is projected using a video projector each projected pixel may not correspond exactly to the original pixel due to physical limitations of the video projector. Typically, the power of projection light is limited and the colour space available may not match exactly the original colour space. Moreover the luminosity decreases with the distance between the projector and the projection surface. The way the projector affects the source pixel to generate a projected pixel may be modelled as a transfer function.

When projecting the image on a projection surface, the perceived pixel will correspond to the projected pixel as reflected by the projection surface. The perceived pixel is therefore dependent on the albedo of the projections surface. The albedo corresponds to the "whiteness" of the surface, namely it is a reflection factor with a value between 0, corresponding to a perfectly black surface with no reflection at all, and 1 for a perfect reflection of a perfectly white surface. In actual projection condition, generally external light sources are present in addition to the projected image, meaning that the perceived pixel also depends on this additional light. We might summarize the relation between a given resulting pixel $P_p$ in a projected image and the original pixel in the source image as follow:

$$P_p = (P(P_o) * C_d) * a + l \qquad (1)$$

where $P_o$ is the original pixel, $P(x)$ is the transfer function of the projector due to its physical limitations, $C_d$ is an attenuation parameter due to the distance between the projector and the projection surface, a is the albedo of the projection surface and l is the contribution to the perceived pixel of the external light received on the projection surface at the pixel location. This equation may be simplified to integrate the attenuation parameter due to the distance and the projection surface albedo into a resulting albedo $a_r$:

$$P_p = P(P_o) * a_r + l \qquad (2)$$

This equation would be true for the projection of a single pixel. When projecting a complete image of pixels, the light from the neighbour pixels interact with the projection of any particular pixels. A full model of the projection of an image may be summarized by the following equation:

$$y_{u,v} = A_{u,v}^{i,j} P(x_{i,j}) + l_{u,v} \qquad (3)$$

Where $y_{u,v}$ is the two-dimension matrix representing the resulting image on the projection surface indexed by pixel coordinates (u, v). $x_{i,j}$ is the two-dimension matrix representing the source image being projected indexed by pixel coordinates (i, j). $P(x_{i,j})$ is the two-dimension matrix representing the source image transformed by the projector, this is the actually projected image. $A_{u,v}^{i,j}$ is a kernel representing the albedo. This kernel is a four dimensions matrix indexed by pixel coordinates (i, j) of the source image and pixel coordinates (u, v) of the resulting image. $l_{u,v}$ is a two dimensions matrix representing the contribution of external light on the resulting image indexed by the pixel coordinates (u, v).

It may be seen that the best projection conditions require a projection surface as close to a uniformly white surface with an actual albedo as close to 1 as possible used in a dark room with no external light.

It would be advantageous to get rid of the projection screen and be able to project on nearly any projection surface, even textured ones, like a wall in a room possibly integrating a textured wood door for example, and still get the best possible perceived projected image. It is also advantageous to consider that, in actual condition, the projection room is never perfectly dark and that the external light should be taken into account.

The problem is to improve the projection results of a video on a non-uniform projections surface in presence of external light.

A solution to this problem would be to determine the kernel $A_{u,v}^{i,j}$ and the external light contribution $l_{u,v}$ then knowing the transfer function of the projector P, it would be possible to apply the inverse function of the model in equation (3) to the source image before projection in order to compensate the whole projection process and obtaining a resulting image on the projection surface that corresponds to the source image.

This theoretical solution suffers several drawbacks. The first challenge is the huge number of values to determine due to the size of the kernel. For example, using images in full HD resolution of 1920×1200, the kernel has about $5.3 \cdot 10^{12}$ values to be determined. Another drawback lies in the physical capabilities of the projector. For example, compensating for a dark zone of the projection surface might require the projection of pixels with a light power exceeding the actual power of the projector.

BRIEF SUMMARY OF THE INVENTION

The present invention has been devised to address one or more of the foregoing concerns. It concerns a colorimetric compensation method that advantageously works with the actual images of a video sequence to be projected with no constraints on these images.

According to a first aspect of the invention there is provided a method of pixel colorimetry compensation in a projection system, the projection system comprising a projector, a camera and a pixel colorimetry compensation module, characterized in that the method comprises:

initializing current coefficients of a model of the transfer function of a projection surface; and iteratively:

determining a target image by applying global parameters transformation on a source image;

determining a compensated image by applying an inverse transfer function of the projector and an inverse transfer function of the projection surface computed with the model based on the current coefficients;

obtaining a captured image of the projection, by the projector, of the compensated image on a projection surface;

updating the current coefficients with new values obtained by minimizing a distance between the captured image and a model of this image based on the model of the transfer function of the projection surface applied to the target image.

In an embodiment, the model of the transfer function of the projection surface is expressed as a linear combination of a base, the coefficients of the linear combination of bases being expressed as a linear combination of a set of continuous parametric functions.

In an embodiment, the base is composed of:
a first base depending on the position of the projected pixels; and
a second base independent of the position of the projected pixels.

In an embodiment, the set of continuous parametric functions is composed of DCT parametric functions and/or polynomial parametric functions.

In an embodiment, the model of the transfer function of the projection surface is expressed as:

$$y_{u,v} = (\Sigma_b(a_{u,v} \cdot \Sigma_e(c_{e,b} C_{b,u,v}{}^e) \cdot B_{u,v}{}^{i,j,b}) + \Sigma_{b'}(\Sigma_d(\Delta_{d,b'} D_{b',u,v}{}^d) \cdot B{}^{u,j,b'})) \cdot x_{i,j} + b_{u,v}:$$ wherein:

$y_{u,v}$ is the two-dimension matrix representing the resulting image on the projection surface indexed by pixel coordinates (u, v), $x_{i,j}$ is the two-dimension matrix representing the source image being projected indexed by pixel coordinates (i, j);

$B_{u,v}{}^{i,j,b}$ is a predefined base constituted by a set of matrices indexed by index b;

$B^{u,j,b'}$ is a predefined base constituted by a set of matrices indexed by b';

$\Delta_{d,b'}$ is a scalar coefficient indexed by d and b';

$c_{e,b}$ are scalar coefficients indexed by e and b;

$a_{u,v}$ is a coefficient representing the albedo of the projection surface;

$D_{b',u,v}{}^d$ and $C_{b,u,v}{}^e$ are predefined d-indexed and e-indexed sets of continuous parametric functions;

$b_{u,v}$ represents the external light.

In an embodiment, the global parameters used to determine the target image are an average value of the albedo of the projection surface and an average value of the external light on the projection surface.

In an embodiment, determining the target image further comprises:
introducing a predetermined level of noise in the target image.

In an embodiment, introducing a predetermined level of noise in the target image is only done for a predetermined number of first images of a sequence of images.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a projection system comprising:
a projector;
a camera; and
a pixel colorimetry compensation module,
characterized in that the pixel colorimetry compensation module comprises:
means for initializing current coefficients of a model of the transfer function of a projection surface; and iteratively:
means for determining a target image by applying global parameters transformation on a source image;
means for determining a compensated image by applying an inverse transfer function of the projector and an inverse transfer function of the projection surface computed with the model based on the current coefficients;
means for obtaining a captured image of the projection, by the projector, of the compensated image on a projection surface;
means for updating the current coefficients with new values obtained by minimizing a distance between the captured image and a model of this image based on the model of the transfer function of the projection surface applied to the target image.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE SEVERAL VIEWS OF THE DRAWING(S)

Embodiments of the invention will now be described, by way of example only, and with reference to the following drawings in which.

DETAILED DESCRIPTION OF THE INVENTION

The goal of the invention is to compensate in real time the colorimetry of a sequence of images projected on a non-uniform projection surface taking into account the external light in the projection room. The compensation should use the actual video sequence to be projected without requiring specific dedicated images and no specific calibration process.

According to one aspect of the invention, a target image is determined. This target image is close to the source image and can be seen as an alternative source image. Instead of looking for compensating the resulting image in an attempt to get the source image, the compensation will try to get a resulting image as close as possible to this target image. The target image is obtained by applying global change parameters to the source image. The idea is that human vision is not very sensitive to global alteration like a modification of the gamma, an image globally darker than the source one and the like. In other words, the invention aims at compensating local alterations in the resulting image but not, or at least not totally, global alterations.

According to a second aspect of the invention, when determining the compensation to be applied to the target image, a model of the projection of the image is calculated. In order to achieve a real-time computation, the full model as disclosed in equation (3) is simplified in an innovative way. This simplification aims at taking advantage of the pre-eminence of the neighbour pixel on a resulting pixel. It is also taken into account that the texture of a projection surface and the external light both typically exhibit low frequencies. Based on these assumptions, it is possible to simplify the full model of the projection to get a reasonable complexity of the problem to be solved.

Figure 1:
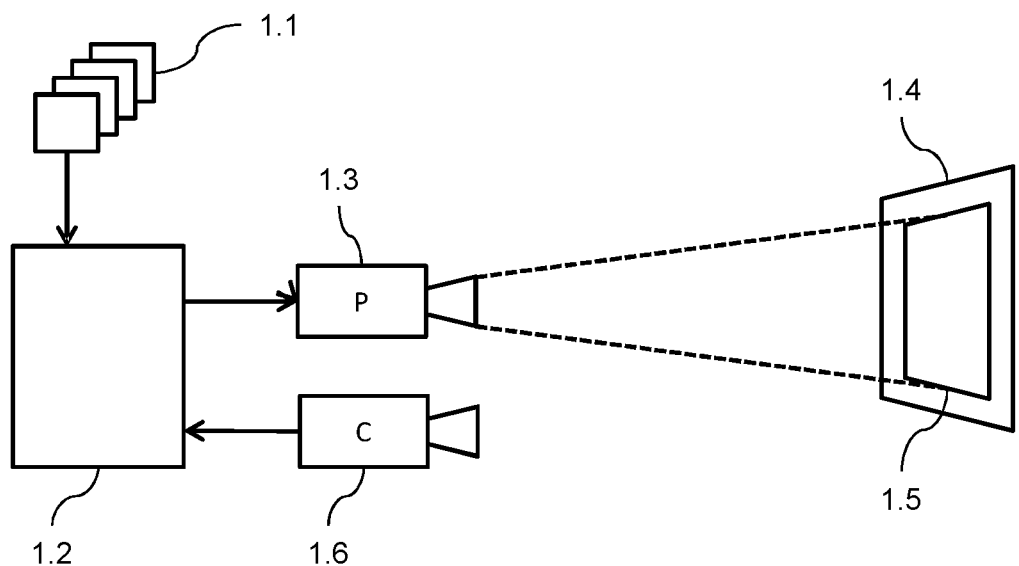
FIG. 1 illustrates the architecture of a colorimetric compensation system according to an embodiment of the invention.

FIG. 1 illustrates the architecture of a colorimetric compensation system according to an embodiment of the invention. A sequence of original images 1.1 is input in a compensation device 1.2 for colorimetry compensation. The compensation device is typically a computing device that implements image processing. It is also in charge of controlling a projector 1.3 for the projection of images on a projection surface 1.4 resulting in a projected sequence of images 1.5. In order to compute the compensation, the system also comprises a camera 1.6 to capture the projected images. The captured images are also input in the compensation device 1.2 to be used for the compensation method implemented within the compensation device 1.2. The compensation device 1.2, the video projector 1.3 and the camera 1.6 may be implemented as separated connected devices or integrated in one or two different devices.

Figure 2:
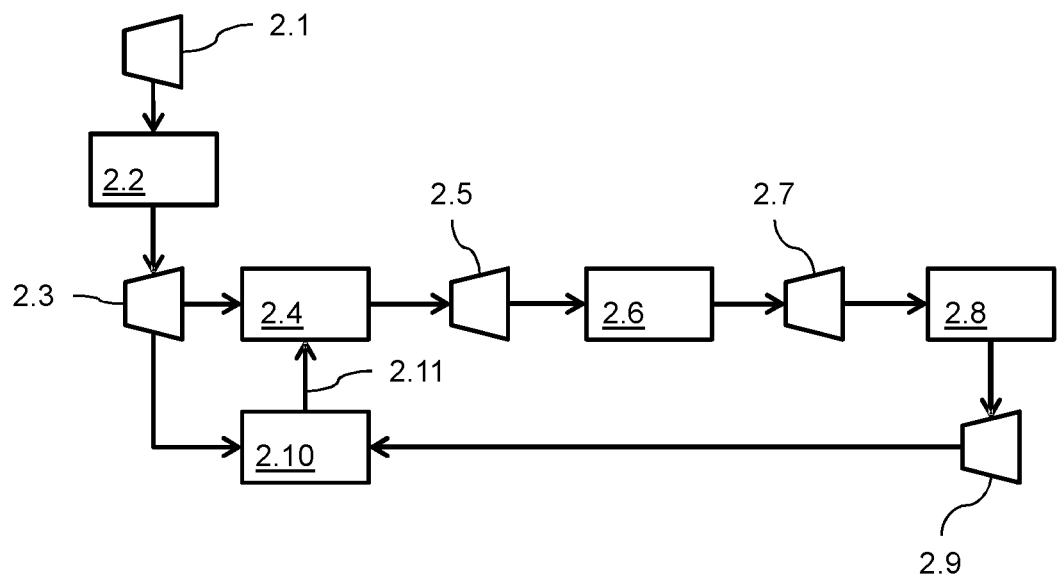
FIG. 2 illustrates the general logic architecture of the colorimetric compensation method according to an embodiment of the invention.

FIG. 2 illustrates the general logic architecture of the colorimetric compensation method implemented within the colorimetric compensation device 1.2 according to an embodiment of the invention. Input original images 2.1 are processed by a target module 2.2 in order to generate a target image 2.3. The target image 2.3 is processed by a compensation module 2.4 to get a compensated image 2.5. This compensated image 2.5 is then projected by the projector on the projection surface to obtain on this projection surface a resulting image 2.7. The resulting image 2.7 is captured by the camera 2.8 to obtain a measured image 2.9.

A comparison module 2.10 then compares the measured image 2.9 with the generated target image 2.3. From the comparison, the comparison module 2.10 generates compensation parameter 2.11 for the compensation module 2.4 in order to minimize the difference between the measured image 2.9 and the target image 2.3.

Intuitively we would like to compensate the projected image in order to minimize the difference between the projected resulting image and the original image. The goal would be to get a projected image as close as possible to the original image as possible. Unfortunately, this approach does not work for the following reason. When projecting an image on a textured projection surface, the albedo of the projection surface is not uniform. It means that some parts of the image are projected on a low albedo surface while other parts of the image are projected on high albedo surface. In order to compensate the low albedo of some parts of the image, pixels projected on these parts should have their luminosity increased. As the light power of the projector is limited, the possibility to increase the luminosity of a given pixel for compensation is also limited. Due to this limitation, trying to compensate the projected image in a perfect way to retrieve an image as close as possible to the original image is likely to introduce some discrepancies in the image with parts that may be correctly corrected while other close parts cannot because the correction would require a level of light power from the projector which is not available. These local disparities in the level of correction are disturbing to the human eye leading to a poor result.

While local disparities in the level of compensation are disturbing, global attenuation of the luminosity are much less disturbing for the user. It is therefore advantageous to decrease the global luminosity of the image, for example, and to keep an approximately uniform level of compensation within the image. This is the reason why a target image is generated. The target image is a reasonable target for the compensation process in order to get a good resulting image based at least on the physical limitation of the projector, the average level of the external light and the average albedo of the projection surface. In other words, we focus on compensation of local disparities, not on global ones. The generation of the target image will be detailed later.

When considering the compensation it is assumed that the geometric relation between the source image and the captured image is known. This geometric relation may take into account any geometric correction due to a non-plan projection surface or the fact that the projection surface may not be orthogonal to the optical axis of the projector. Solutions exist to the geometry correction in most cases. We focus in this document on the colorimetric correction assuming that both the source image and the captured image are rectangular, while their resolution may be different. We are able to associate a pixel in the source image to its corresponding zone in the captured image and to associate a pixel in the captured image to its corresponding zone in the source image.

Figure 3:
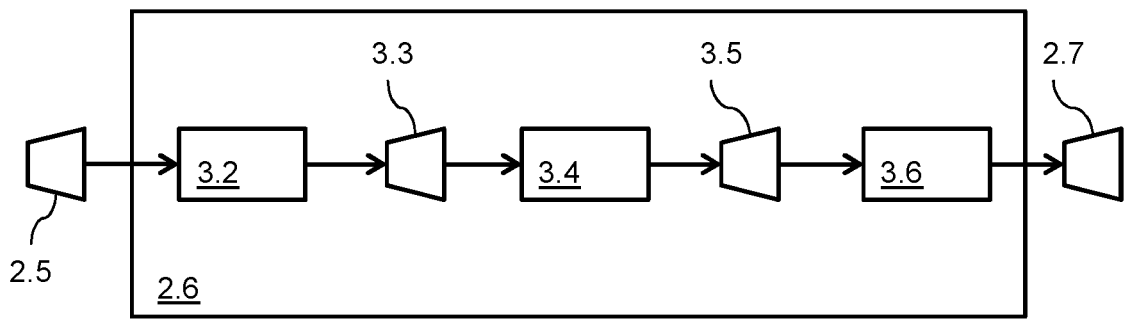
FIG. 3 illustrates the detail of the projection process followed by the capture by the camera according to an embodiment of the invention.

FIG. 3 illustrates the detail of the projection process 2.6 followed by the capture by the camera 2.8 in FIG. 2.

The compensated image 2.5 is the input image of the projector 3.2. The projection may be seen as taking an input which is a two dimensions matrix of pixels with RGB values and transforming it into electromagnetic waves at the output of the projector. It may be modelled as a transfer function P transforming the compensated image 2.5 into a projected image 3.3. The projected image 3.3 is projected on a projection surface 3.4 which may be modelled as a transfer function S to obtain a resulting image 3.5. The resulting image as seen on the projection surface 3.4 is captured by a camera to obtain the measured image 2.7. This capture may be modelled as a transfer function C. This complete process may be modelled as follows:

$$I_M = (C \circ S \circ P)(I_C) \quad (4)$$

Where $I_C$ is the compensated image, $I_M$ is the measured image by the camera, P is the transfer function of the projector, S is the transfer function of the projection surface and C is the transfer function of the camera.

In a particular system, the projector and the camera being chosen, transfer functions P and C are known. They may be given by the manufacturer of the projector and the camera or measured on the actual device. The only unknown is the transfer function of the projection surface.

One of the problems to be solved is to determine the transformation to be applied by the compensation module 2.4 to the target image 2.3, $I_T$, in order to get a resulting image 2.7, $I_R$ as close as possible to the target image 2.3, $I_T$. To achieve this goal we know the target image $I_T$ and we measure the measured image $I_M$. We know that the resulting image $I_R$ is modelled as $(S \circ P)(I_C)$, and also corresponds to $C^{-1}(I_M)$. Then the compensation to be applied to the target image $I_T$ to obtain the compensated image $I_C$ should verify:

$$I_C = (P^{-1} \circ S^{-1})I_T \quad (5)$$

The projector transfer function P being known, we have to determine the transfer function of the projection surface S in order to get the compensation function ($P^{-1} \circ S^{-1}$).

We have seen that the transfer function S of the projection surface may be modelled from equation (3) as:

$$y_{u,v} = A_{u,v}^{i,j} x_{i,j} + l_{u,v} \quad (6)$$

Where $A_{u,v}^{i,j}$ is a kernel matrix having four dimensions, which represents a parametric model of the albedo of the projection surface and $l_{u,v}$ is a two-dimension matrix having the size of an image, which represents the external light on the projection surface. This model is parametric. In order to determine the parameters defining the transfer function S, it is possible to iteratively determine the values of these parameters, from chosen initial value, by minimizing the distance between the measured image and the one predicted based on the parametric model of the transfer function S of the projection surface. The parametric model may be initialized assuming a perfect screen and no external light. Using these parameters, it is possible to calculate the compensated image $I_C = (P^{-1} \circ S^{-1})I_T$. Then, the parameters of the model of S are determined using the formula:

$$\text{Argmin}(\text{dist}(C \circ S \circ P(I_C), I_M)) \quad (7)$$

In practice, using the full model of equation (6) leads to hours of computation and needs to calculate the argmin on hundreds of images to converge. The argmin function may be calculated using the least squares method. As a goal of the invention is to compensate in real-time projected images, the use of the full model is not practical. We propose to simplify this model in order to obtain a simplified model with a more limited number of parameters that allow to solve the argmin in real-time while still correctly modelling the influence of the non-uniform projection surface and the external light in order to realize the compensation. Advantageously, the determination of the parameters of the model only needs a few images to converge.

The size of the kernel $A_{u,v}^{i,j}$ is $w^2 h^2$, approximately $10^{12}$ coefficients.

The first idea is to assume that the impact of the other pixels on the value of a given pixel is limited to the neighbourhood of the pixel or limited to a given narrow location. To express this constraint, it is chosen to express the kernel according to a limited number of bases according to the following equation:

$$A_{u,v}^{i,j} = \sum_b (\alpha_{u,v,b} B_{u,v}^{i,j,b}) + \sum_{b'} (\beta_{u,v,b'} B'^{i,j,b'}) \quad (8)$$

Figure 6:
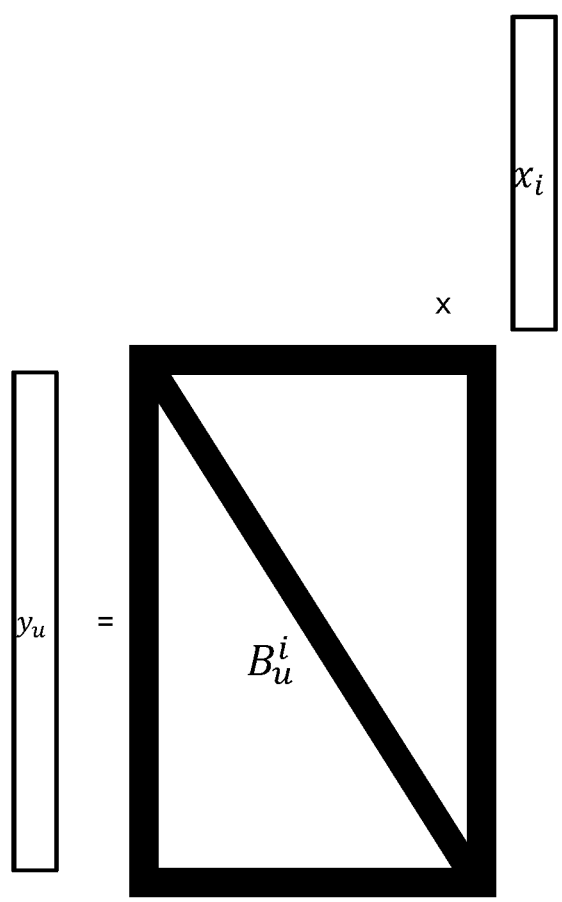
FIG. 6 illustrates the concept of base in a one-dimensional example.

Let us introduce the concept of base B. In a one-dimensional world, as illustrated by FIG. 6, if we consider an output vector y of dimension dim(u) depending on an input vector x of dimension dim(i), such as $y_u = A_u^i x_i$. In the general case, $A_u^i$ is a full matrix of dimensions dim(u, i), and we propose to reduce the dimensionality by rewriting $A_u^i$ as $\alpha B_u^i$, with $\alpha$ a scalar and $B_u^i$ a sparse matrix (base). A simple example is choosing $B_u^i$ diagonal. In this case, all values of the output vector depend of a single input value, scaled by a (assuming the dimension of u is greater than the dimension of i). In this simple case, the solving of $A_u^i$ is greatly reduced. Another base can be chosen, like a tridiagonal matrix. While being described with diagonal or tridiagonal matrices as bases, the invention is not limited to these examples, other bases may be contemplated.

Now the scalar a could be different for each output dimension u. $A_u^i$ becomes $\alpha_u B_u^i$ (note that $\alpha_u$ is a vector of dimension dim(u) and is component-wise multiplied to each $B_u^i$ individual item). We can also use a combination of more than one base to express the model we want to solve. This leads to the final writing: $A_u^i = \Sigma_b (\alpha_{u,b} B_u^{i,b})$. b is the number of bases we use, indexing $\alpha$ and B. Here we can see that each output value from $y_u$ depend on a combination of specific input values from $x_i$.

Figure 7:
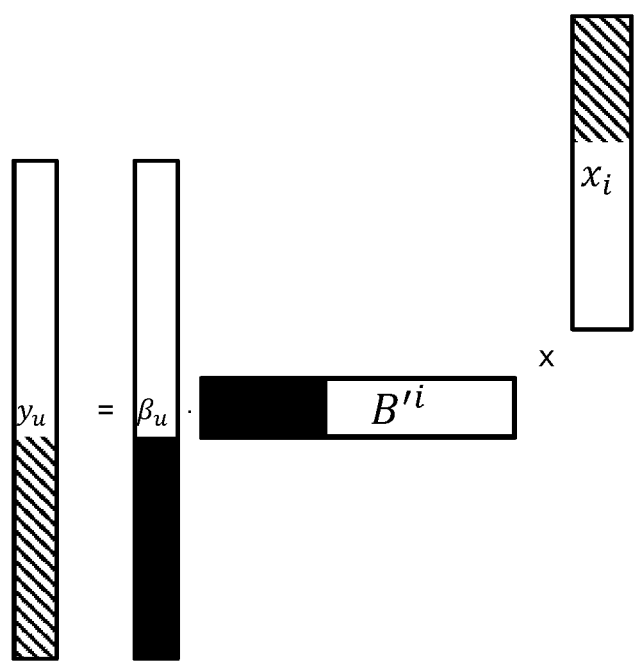
FIG. 7 illustrates an example of one-dimensional base.

We can model another effect, where a whole region of input data affects "in average" a specific region of output data. Let us pose $y_u = \beta_u B'^i x_i$. Here the base B' is a vector of dimension dim(i), dotted with $x_i$ to produce a scalar value, or a sort of average as illustrated by FIG. 7. Then this scalar is multiplied by a vector $\beta_u$ of dimensions dim(u), to produce the output. Now with this model we can average a part of the input via $B'^i$ to affect a part of the output via $\beta_u$. In our one-dimensional world, the final formulation for our model would be:

$$A_u^i = \sum_b (\alpha_{u,b} B_u^{i,b}) + \sum_{b'} (\beta_{u,b'} B'^{i,b'})$$

Note that $\alpha_u B_u^i$ is a matrix of dimensions dim(u, i), and that $\beta_u B'^i$ as well, as it is a multiplication of two vectors of dimensions respectively dim(u) and dim(i).

Back to our initial problem, the first term $\Sigma_b (\alpha_{u,v,b} B_{u,v}^{i,j,b})$ is a relative factor which depends on the position (u, v) in the resulting image. This is to model the impact of each source pixel on each destination pixel.

The second term $\Sigma_b (\beta_{u,v,b'} B'^{i,j,b'})$ is a global factor independent of the position (u, v). More precisely the only term dependant of (u, v) is $\beta_{u,v,b''}$ which is a matrix of dimension dim(u, v) and not dependant of the source image $x_{i,j}$. This allows us to model the global illumination for instance, where a part of the source image can affect, on average, specific zones of the output image.

The $B_{u,v}^{i,j,b}$ is a base B constituted by a set of matrices indexed by index b, the number of matrices is small, typically around ten matrices. Similarly, the $B'^{i,j,b'}$ is a base B' constituted by a set of vectors indexed by b' with a small number of vectors, typically around ten. The base B' is here to compensate global illumination problems where a part of the projected image is reflected onto another part of the projected image, when the geometry of the scene is a corner for instance. The base B' can be chosen accordingly to the observed geometry, but a first implementation can include, for example, bases averaging image zones like left, right, upper and lower part of the image.

Base B is chosen with matrices $B_{u,v}^{i,j,b}$ being invariant in translation, which means that:

$$\forall i,j,v B_{u,v}^{i,j,b} = B_{u+d_i,v+d_j}^{i+d_i,j+d_j,b}; \text{ with } \dim(u,v) = \dim(i,j)$$

with i, j, i+$d_i$, j+$d_j$ in bounds (w, h), and assuming that input and output dimensions are the same. Otherwise $B_{u,v}^{i,j,b}=0$ which means that the matrix is sparse.

When the kernel $A_{u,v}^{i,j}$ is expressed this way, the number of coefficients and therefore the number of parameters to determine is decreased to correspond to the size of an image wh multiplied by the sum of the cardinals of the two bases B and B', namely about 20. $10^6$ instead of about $10^{12}$ for the full kernel.

In their generality, the coefficients $\alpha_{u,v,b}$ et $\beta_{u,v,b'}$ are set of matrices having the size of an image, the set being indexed by indexes b and b'. It is possible to reduce the complexity of these coefficients to take into account the fact that, typically, the evolution of the albedo and the external light exhibit some low frequencies. This may be done by expressing these coefficients as continuous functions over the image space. These functions being continuous, their evolution on the image space limit the model of the coefficient to exhibit low frequencies. This will reduce the complexity of the parameters to be evaluated from complete image size matrices of parameters to a few parameters defining the continuous functions. As an example, these functions may be chosen to be DCT coefficients or low order polynomial functions, typically an order between three and five.

The $\beta_{u,v,b'}$ coefficients may be expressed as:

$$\beta_{u,v,b'} \sum_{d} (\Delta_{d,b'} D_{b',u,v}^d) \quad (9)$$

where $\Delta_{d,b'}$ is a scalar coefficient indexed by d and b'. The d index takes values in a small range of typically about ten values. For a given b', $D_{b',u,v}^d$ is a d-indexed set of low spatial frequency base functions, typically DCT or low order polynomial function.

In some embodiments, the d-indexed set of function is the same for all the b' base elements $B'^{i,j,b'}$.

The $\alpha_{u,v,b}$ coefficients may be expressed in the same way as:

$$\alpha_{u,v,b} = \sum_{e} (a_{u,v} c_{e,b} C_{b,u,v}^e) = a_{u,v} \cdot \sum_{e} (c_{e,b} C_{b,u,v}^e) \quad (10)$$

where $a_{u,v}, c_{e,b}$ are scalar coefficients indexed by e and b. The e index takes values in a small range of typically about ten values. This coefficient has been separated into $a_{u,v}$ which expresses the albedo and a given coefficient $c_{e,b}$. For a given b, $C_{b,u,v}^e$ is a e-indexed set of low spatial frequency base functions, typically DCT or low order polynomial function.

By applying all these simplifications, we get the final equation:

$$y_{u,v} = \left( \sum_{b} \left( a_{u,v} \cdot \sum_{e} (c_{e,b} C_{b,u,v}^e) \cdot B_{u,v}^{i,j,b} \right) + \sum_{b'} \left( \sum_{d} (\Delta_{d,b'} D_{b',u,v}^d) \cdot B'^{i,j,b'} \right) \right) \cdot x_{i,j} + b_{u,v} \quad (11)$$

In this formula, bases $B_{u,v}^{i,j,b}$ and $B'^{i,j,b'}$, and continuous functions $C_{b,u,v}^e$ and $D_{b',u,v}^d$ are predefined and therefore known, while coefficients $a_{u,v}$, representing the albedo, $c_{e,b}$, $\Delta_{d,b'}$ and $b_{u,v}$ representing the global illumination and external light are to be evaluated using the argmin determination. It comes that the number of coefficients to be evaluated has been decreased to approximately $10^6$ instead of the approximately $10^{12}$ coefficients of the full model.

Accordingly the model of the transfer function of the projection surface S has been simplified. First, taking into account that the influence of other pixels on the resulting colour of a given pixel is mainly due to its neighbours, the kernel is expressed as a linear combination of a small number of bases, these bases being invariant in translation. The model is further simplified to take into account the low frequency feature of typical texture of the projection surface and of the global illumination. This is done by expressing the coefficients of the linear combination as parametric continuous functions. The so simplified model may be solved using the argmin function in real time.

Figure 4:
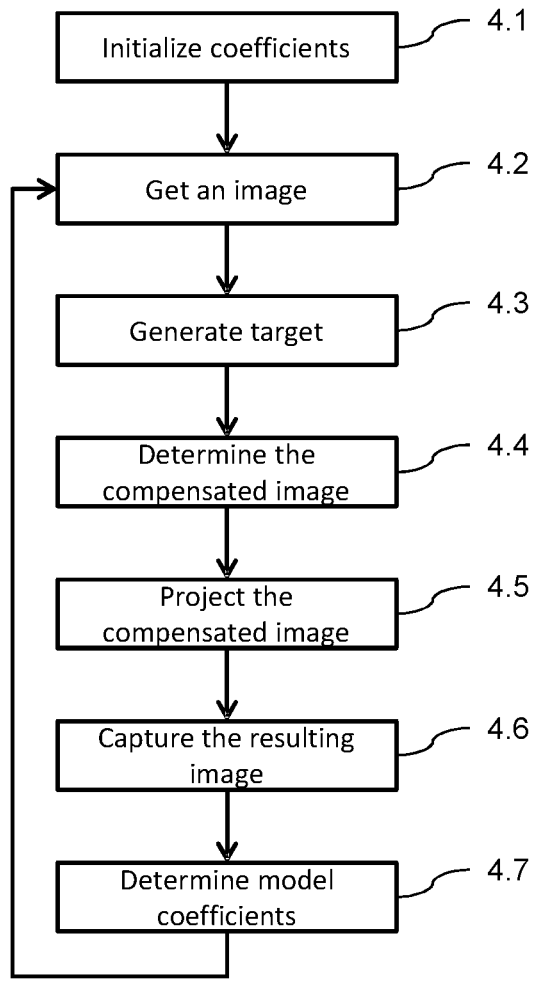
FIG. 4 illustrates the flow chart of the method for colorimetry correction according to an embodiment of the invention.

FIG. 4 illustrates the organigram of the method for colorimetry correction according to an embodiment of the invention.

In a step 4.1 the coefficients of the model are initialized to a default value. Typically, these default values assume perfect projection conditions. For example, in an exemplary embodiment, according to the model as expressed in equation (11), $b_{u,v}$ is assumed to be null which correspond to a situation with no external light. Coefficients $a_{u,v}$, $c_{e,b}$ and $\Delta_{d,b'}$ are chosen to be constituted by value 1, corresponding to a perfect albedo.

In a step 4.2, the system gets an original image to be projected. The first time this step is executed, this image is typically the first image of a sequence of images to be projected.

In a step 4.3, the target image is generated. As explained above, this target image is a transform of the original image with global parameters. The aim is to get an image, close to the original image, which can be corrected locally to compensate for the irregularity of the projection surface and of the ambient light. In an exemplary embodiment, the target image is computed based on an average value A of the albedo of the projection surface and an average value L of the external light. Namely, according to the model as expressed by equation (11), these mean values are obtained by:

$$\begin{cases} A = \dfrac{\sum_{u,v} a_{u,v}}{w \cdot h} \\ L = \dfrac{\sum_{u,v} b_{u,v}}{w \cdot h} \end{cases} \quad (12)$$

It comes that, according to initialization coefficient values, the first time this step is executed, A=1 and L=0.

In some embodiments, the average may be replaced by a median value, a variance or any other function that allows to derive a global value representative of the albedo for A and of the external light for L.

In a first embodiment, the target image is computed from A and L, for example according to:

$$I_T = A \cdot I_o + L \quad (13)$$

Where $I_o$ is the original image and $I_T$ the target image. Intuitively, when the projection surface combined with the external light tend to render a resulting image clearer than the original image, the target image will be globally clearer. We will not try to compensate for this global behaviour.

Using these average values might prove to be excessive. In an alternate embodiment, the target image is taken as a linear combination of the original image and this globally altered image. For example, the target image might be calculated as:

$$I_T = \alpha \cdot (A \cdot I_o + L) + (1-\alpha) \cdot I_o \quad (14)$$

where α is a parameter chosen, for example, based on the light power of the projector. A projector with a high light power is able to better compensate the image and therefore the target image may be chosen closer to the original image. This α parameter may also depend on how irregular is the projection surface. When low level of compensation is needed, the target image can be closer to the original image.

In a step 4.4, the compensated image is generated from the target image. The compensation is done by applying equation (5):

$$I_C = (P^{-1} \circ S^{-1}) I_T \quad (15)$$

Where $P^{-1}$ is the inverse transfer function of the projector P, which is assumed to be known, and where $S^{-1}$ is the inverse transfer function of the projection surface S, which is determined using the current values of the coefficients of the model as expressed in equation (11).

In a step 4.5, the compensated image is projected to the projection surface.

In a step 4.6, the projected image is captured by the camera to get a captured image.

In a step 4.7, a new version of the coefficients of the model is determined by executing the argmin function to minimize the distance between the captured image and a model of this image obtained according to equation (7) where the transfer function of the projection surface is expressed according to the simplified model of equation (11). This new version of the coefficients of the model replaces the current one for the computation of the next image in the sequence by looping back to step 4.2.

Accordingly, the projection of each image of the sequence corresponds to an adjustment of the coefficients of the model. The speed of convergence the method to get relevant values of the coefficient that offer a correct model of the transfer function of the projection surface depends on the type of images present in the sequence. Usually, good coefficients are obtained very fast from the first images of the sequence. The method converges after only a few images, typically between three and ten images. It means that, in less than a second of projection, a very accurate compensation of the irregularity of the projection surface is obtained.

Some image sequences may present large static zone, meaning zone in the source image where pixel values do no change between images. This is the case, for example, when the projector is used to project the screen of a computer. In that case, the proposed method is unable to discriminate between the albedo and external light as the cause of pixel alteration. We recall that albedo from a texture in the projection surface has a multiplicative effect on the projected pixel while the external light has an additive one. As long as the value of the pixel does not change, the estimated albedo and external light for this pixel may not be accurate. This fact does not prevent the method to accurately compensate, even with wrong estimate of albedo and external light, these pixels as long as their value is static. When the value of these pixels start changing, the wrong estimates of albedo and external light may cause some wrong compensation on a few images, the time for the method to converge to more accurate estimates.

A solution to this problem is to introduce variation to the target image in order to prevent pixels value to be static. This may be done, for example, by introducing a level of noise randomly in the target image. By keeping this level of noise low, the degradation of the projected image is typically unnoticeable, or almost unnoticeable, for the user. These small variations introduced in pixel values ensure that the proposed method rapidly converges to estimate accurate coefficients value for the model over the complete image.

Advantageously, in order to limit the degradation of images, this introduction of noise in the target image is limited to a given number of images at the beginning of the image sequence. For example, noise is only introduced into the ten or twenty first images of the sequence.

Figure 5:
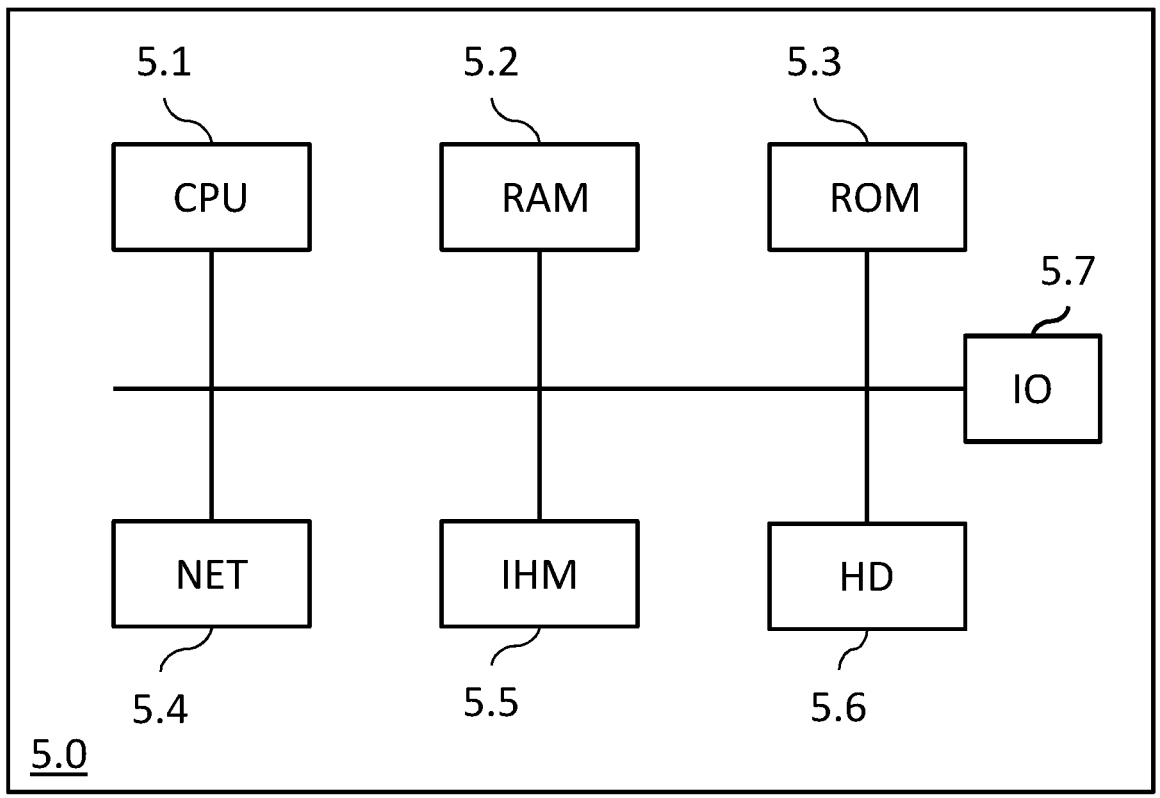
FIG. 5 is a schematic block diagram of a computing device for implementation of one or more embodiments of the invention.

FIG. 5 is a schematic block diagram of a computing device 5.0 for implementation of one or more embodiments of the invention. The computing device 5.0 may be a device such as a microcomputer, a workstation or a light portable device. The computing device 5.0 comprises a communication bus connected to:

a central processing unit 5.1, such as a microprocessor, denoted CPU;

a random access memory 5.2, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read-only memory 5.3, denoted ROM, for storing computer programs for implementing embodiments of the invention;

a network interface 5.4 is typically connected to a communication network over which digital data, such as video data, to be processed are transmitted or received. The network interface 5.4 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 5.1;

a user interface 5.5 may be used for receiving inputs from a user or to display information to a user;

a hard disk 5.6 denoted HD may be provided as a mass storage device;

an I/O module 5.7 may be used for receiving/sending data from/to external devices such as a video source or display.

The executable code may be stored either in read-only memory 5.3, on the hard disk 5.6 or on a removable digital medium such as for example a disk. According to a variant, the executable code of the programs can be received by means of a communication network, via the network interface 5.4, in order to be stored in one of the storage means of the communication device 5.0, such as the hard disk 5.6, before being executed.

The central processing unit 5.1 is adapted to control and direct the execution of the instructions or portions of software code of the program or programs according to embodiments of the invention, which instructions are stored in one of the aforementioned storage means. After powering on, the CPU 5.1 is capable of executing instructions from main RAM memory 5.2 relating to a software application after those instructions have been loaded from the program ROM 5.3 or the hard-disc (HD) 5.6 for example. Such a software application, when executed by the CPU 5.1, causes the steps of the flowcharts shown in FIG. 4 to be performed.

Any step of the algorithm shown in FIG. 4 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of colorimetry compensation in a projection system, the projection system comprising a projector, a camera, and a pixel colorimetry compensation module, wherein the method comprises by the pixel colorimetry compensation module the steps of:
   initializing current coefficients of a model of the transfer function of a projection surface; and iteratively:
   determining a target image by applying global parameters transformation on a source image;
   determining a compensated image by applying an inverse transfer function of the projector and an inverse transfer function of the projection surface computed with the model based on the current coefficients;
   obtaining a captured image of the projection, by the projector, of the compensated image on a projection surface; and
   updating the current coefficients with new values obtained by minimizing a distance between the captured image and a model of this image based on the model of the transfer function of the projection surface applied to the target image.

2. The method of claim 1, wherein:
   the model of the transfer function of the projection surface is expressed as a linear combination of a base, the coefficients of the linear combination of bases being expressed as a linear combination of a set of continuous parametric functions.

3. The method of claim 2, wherein the base is composed of:
   a first base depending on the position of the projected pixels; and
   a second base independent of the position of the projected pixels.

4. The method of claim 3, wherein the model of the transfer function of the projection surface is expressed as:

$$y_{u,v} = (\Sigma_b(a_{u,v} \cdot \Sigma e(c_{e,b} C_{g,u,v}^e) \cdot B_{u,v}^{i,j,b}) + \Sigma_b(\Sigma_d(\Delta_{d,b} D_{b',u,v}^d) \cdot B^{i,j,b'})) \cdot x_{i,j} + b_{u,v};$$ wherein:

$y_{u,v}$ is the two-dimension matrix representing the resulting image on the projection surface indexed by pixel coordinates (u, v);

$x_{i,j}$ is the two-dimension matrix representing the source image being projected indexed by pixel coordinates (i,j);

$B_{u,v}^{i,j,b}$ is a predefined base constituted by a set of matrices indexed by index b;

$B^{i,j,b'}$ is a predefined base constituted by a set of matrices indexed by b';

$\Delta_{d,b'}$ is a scalar coefficient indexed by d and b';

$c_{e,b}$ are scalar coefficients indexed by e and b;

$a_{u,v}$ is a coefficient representing the albedo of the projection surface;

$D_{b',u,v}^d$ and $C_{b,u,v}^e$ are predefined d-indexed and e-indexed sets of continuous parametric functions;

$b_{u,v}$ represents the external light.

5. The method of claim 2, wherein:
   the set of continuous parametric functions is composed of DCT parametric functions and/or polynomial parametric functions.

6. The method of claim 1, wherein the global parameters used to determine the target image are an average value of the albedo of the projection surface and an average value of the external light on the projection surface.

7. The method of claim 1, wherein determining the target image further comprises:
   introducing a predetermined level of noise in the target image.

8. The method of claim 7, wherein:
   introducing a predetermined level of noise in the target image is only done for a predetermined number of first images of a sequence of images.

9. A non-transitory computer-readable storage medium storing instructions of a computer program for implementing a method according to claim 1.

10. A projection system comprising:
    a projector;
    a camera; and
    at least one processor configured to perform pixel colorimetry compensation by at least;

initializing current coefficients of a model of the transfer function of a projection surface; and iteratively:

determining a target image by applying global parameters transformation on a source image;

determining a compensated image by applying an inverse transfer function of the projector and an inverse transfer function of the projection surface computed with the model based on the current coefficients;

obtaining a captured image of the projection, by the projector, of the compensated image on a projection surface; and updating the current coefficients with new values obtained by minimizing a distance between the captured image and a model of this image based on the model of the transfer function of the projection surface applied to the target image.

11. The system of claim 10, wherein:

the model of the transfer function of the projection surface is expressed as a linear combination of a base, the coefficients of the linear combination of bases being expressed as a linear combination of a set of continuous parametric functions.

12. The system of claim 11, wherein the base is composed of:

a first base depending on the position of the projected pixels; and a second base independent of the position of the projected pixels.

13. The system of claim 12, wherein the model of the transfer function of the projection surface is expressed as:

$$y_{u,v} = (\Sigma_b(a_{u,v} \cdot \Sigma_e(c_{e,b} C_{b,u,v}^{e}) \cdot B_{u,v}^{i,j,b}) + \Sigma_{b'}(\Sigma_d(\Delta_{d,b'} D_{b',u,v}^{d}) \cdot B^{i,j,b'})) \cdot x_{i,j} + B_{u,v};$$ wherein:

$Y_{u,v}$ is the two-dimension matrix representing the resulting image on the projection surface indexed by pixel coordinates (u, v);

$x_{i,j}$ is the two-dimension matrix representing the source image being projected indexed by pixel coordinates (i,j);

$B_{u,v}^{i,j,b}$ is a predefined base constituted by a set of matrices indexed by index b;

$B^{i,j,b'}$ is a predefined base constituted by a set of matrices indexed by b' ;

$\Delta_{d,b'}$ is a scalar coefficient indexed by d and b';

$C_{e,b}$ scalar coefficient indexed by d and b';

$a_{u,v}$ is a coefficient representing the albedo of the projection surface;

$D_{b',u,v}^{d}$ and $C_{b,u,v}^{e}$ are predefined d-indexed and e-indexed sets of continuous parametric functions;

$b_{u,v}$ represents the external light.

14. The system of claim 11, wherein:

the set of continuous parametric functions is composed of DCT parametric functions and/or polynomial parametric functions.

15. The system of claim 10, wherein the global parameters used to determine the target image are an average value of the albedo of the projection surface and an average value of the external light on the projection surface.

16. The system of claim 10, wherein determining the target image further comprises:

introducing a predetermined level of noise in the target image.

17. The system of claim 16, wherein:

introducing a predetermined level of noise in the target image is only done for a predetermined number of first images of a sequence of images.

* * * * *